United States Patent [19]

Medders

[11] 4,054,040
[45] Oct. 18, 1977

[54] TELESCOPING TORQUE TRANSMISSION APPARATUS

[75] Inventor: Weldon L. Medders, Houston, Tex.

[73] Assignee: A-Z International Tool Company, Houston, Tex.

[21] Appl. No.: 444,329

[22] Filed: Feb. 21, 1974

[51] Int. Cl.$^2$ ............................................. F16D 3/06
[52] U.S. Cl. ...................................... 64/23; 175/321; 277/205; 403/320
[58] Field of Search ............... 64/23, 9 R, 6; 403/320; 285/13, 14, 228; 277/37, 205; 175/321

[56] References Cited

U.S. PATENT DOCUMENTS

| | | | |
|---|---|---|---|
| 2,334,309 | 11/1943 | Brown | 64/23 |
| 2,953,352 | 9/1960 | Webb | 64/23 |
| 3,329,221 | 7/1967 | Walker | 175/321 |
| 3,339,932 | 9/1967 | Maha | 277/37 |
| 3,738,665 | 6/1973 | Bilco | 277/205 |

Primary Examiner—Samuel Scott
Assistant Examiner—Randall Heald
Attorney, Agent, or Firm—Vinson & Elkins

[57] ABSTRACT

A telescoping torque transmission apparatus including an inner mandrel of upper and lower sections, a sleeve surrounding the mandrel and slidable thereon, a splined drive connection between the sleeve and mandrel with drive keys interposed between all drive surfaces of the spline drive, cartridge seals sealing above and below the spline drive and also defining upper and lower balance chambers between said mandrel and said sleeve, a port through said sleeve communicating with one of said chambers, a port through said mandrel communicating with the other of said chambers, a keyed lock ring having teeth to engage teeth on the upper end of the lower mandrel section and keyed to engage in the spline key ways of the upper mandrel section, a lock ring threaded on the lower end of the upper mandrel section to retain the keyed lock ring in engagement with the lower section teeth to prevent unthreading of the lower mandrel from the upper mandrel and a pressure equalizing valve communicating with the spline drive chamber to equalize pressure therein with external pressures.

6 Claims, 9 Drawing Figures

TELESCOPING TORQUE TRANSMISSION APPARATUS

SUMMARY

The present invention relates to an improved torque transmission apparatus which is telescoping and is provided with pressure balancing chambers. The present invention includes an improved spline driving connection, improved sealing means in the form of sealing cartridges and an improved locking system which assures that the two mandrel sections cannot back off in use.

An object of the present invention is to provide an improved telescoping torque transmission apparatus having a drive connection which is subject to minimum wear on the inner mandrel and outer sleeve.

Another object is to provide an improved telescoping torque transmission apparatus having readily replaceable sealing means which minimize the wear on the main tubular components of the apparatus.

A further object is to provide an improved telescoping torque transmission apparatus with a spline drive which is isolated to prevent entrance of trash and dirt to thereby extend the life of the apparatus and have a minimum of friction for the telescoping action of the apparatus.

A still further object is to provide an improved telescoping torque transmission apparatus having an improved locking connection between two sections of the mandrel which prevents unthreading of the sections.

DESCRIPTION OF THE PREFERRED EMBODIMENTS

Figure 1:
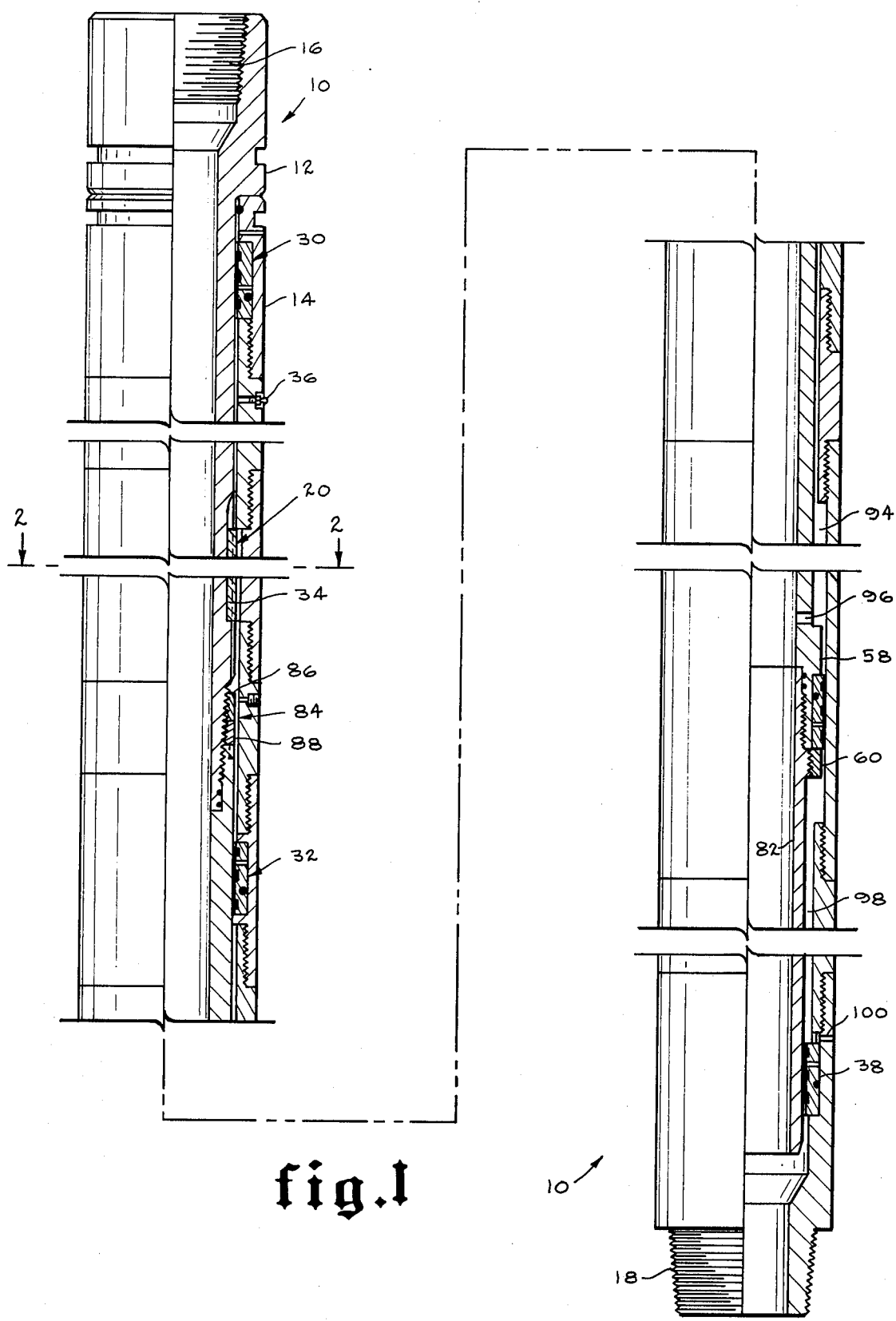
FIG. 1 is a longitudinal quarter section of the improved torque transmission tube and includes both FIGS. 1A and 1B which are provided to show greater detail, FIG. 1B being the lower extension of FIG. 1A.
Figure 2:
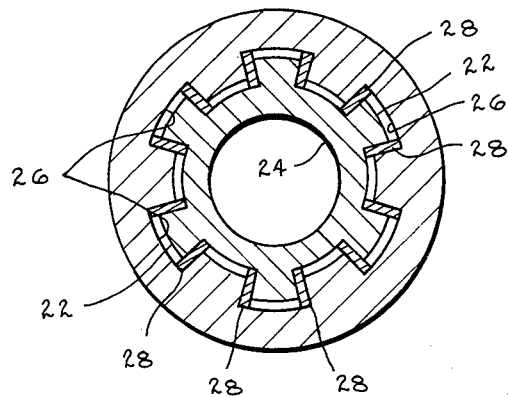
FIG. 2 is a transverse section taken along line 2—2 in FIG. 1 to illustrate the details of the improved spline drive structure.

The improved torque transmission apparatus or tube 10 of the present invention is shown in FIG. 1. This apparatus 10 includes an inner mandrel 12 and an outer sleeve 14 which surrounds the mandrel 12 and is slidable thereon. The upper end of mandrel 12 is internally threaded as at 16 to provide a means for connecting the apparatus to a drill string and the lower end of sleeve 14 is externally threaded as at 18 to provide the means for connecting the lower end of the apparatus to a drill string whereby the improved apparatus of the present invention is readily connected in a drill string.

The torque transmission means 20 is provided to allow the rotational forces on the mandrel 12 to be transmitted to the sleeve 14. Such torque transmission means 20 includes the splines 22 on the exterior of the upper mandrel section 24 which extend into the longitudinal grooves 26 on the interior of sleeve 14. In order to minimize wear on the splines 22 and grooves 26 the drive keys 28 are positioned on both sides of each of the splines 22. The keys 28 have only sufficient play to allow freedom of telescoping movement without excessive wear and are preferably made of a mild steel or a suitable bearing material. With the drive keys 28 on both sides of the splines 22 there is no direct driving contact between the splines 22 and grooves 26 to thereby minimize wear. Also as hereinafter explained the drive keys 28 can be easily and quickly removed and replaced. In order to further minimize wear on the torque transmission means 20 the upper and middle seal means 30 and 32 hereinafter explained in detail. Such sealing means 30 and 32 provide a closed spline drive chamber 34 so that the entry of trash from the exterior of the apparatus is limited. Further the fitting 36 is connected through the upper portion of sleeve 14 and in communication with the interior of chamber 34 to equalize the pressure on the exterior of apparatus 10 with the pressure in drive chamber 34. The fitting 36 is similar to a standard grease fitting having a spring loaded ball check valve therein which is unseated by higher pressures on the exterior of the apparatus 10 as compared to the pressure in chamber 34. Grease or other suitable lubricant such as molybdenum disulfide is pumped through the fitting to completely load the spline drive chamber.

Figure 3:
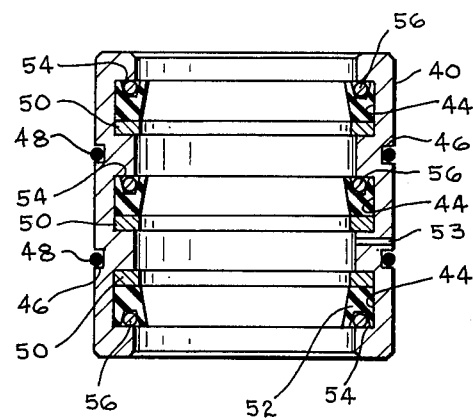
FIG. 3 is a longitudinal cross-sectional view illustrating the details of the improved seal cartridge used in the upper and middle seals.

The upper seal means 30, the middle seal means 32 and the lower seal means 38 are all similar in that they are secured on the interior of sleeve 14 and are adapted to provide sliding seals against the exterior of mandrel 12. As best shown in FIG. 3 the seal means 30 includes a readily replaceable seal cartridge 40. The cartridge 40 includes the tubular body 42 having three inner seal grooves 44 and the outer O ring grooves 46 and seals positioned in each of these grooves as shown. The O rings 48 positioned in the grooves 46 provide the stationary seal against the interior of sleeve 14. The seals positioned in the grooves 44 each include a back-up ring 50. A seal ring 52 having a recess 54 defined in one end face and an O ring 55 positioned in the recess 54 to spread the end of seal ring 52 inwardly and outwardly into sealing engagement with the bottom of the groove 44 and against the exterior of the mandrel 12. It should be noted that middle and lower seal means 32 and 38 differ from seal means 30 only in that the two seals rings 52 in the lower two grooves 40 have their recesses 54 facing the lower end of the apparatus 10 with the seal ring 62 in the upper groove 40 has its recess 54 facing upwardly. In the seal means 30 as shown the upper two seal rings 52 face upwardly and the lower seal rings 52 face upwardly and the lower seal ring 52 faces downwardly.

Figure 4:
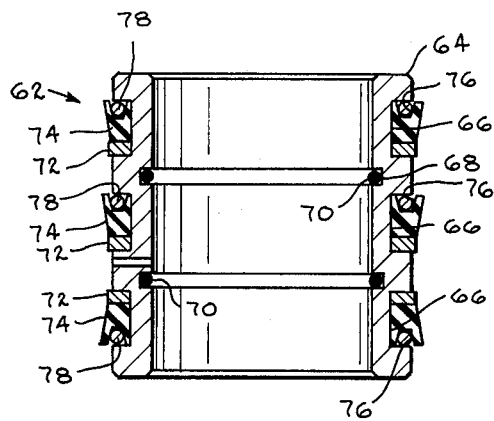
FIG. 4 is a longitudinal cross-sectional view illustrating the details of the improved seal cartridge used in the balance piston seal.
Figure 5:
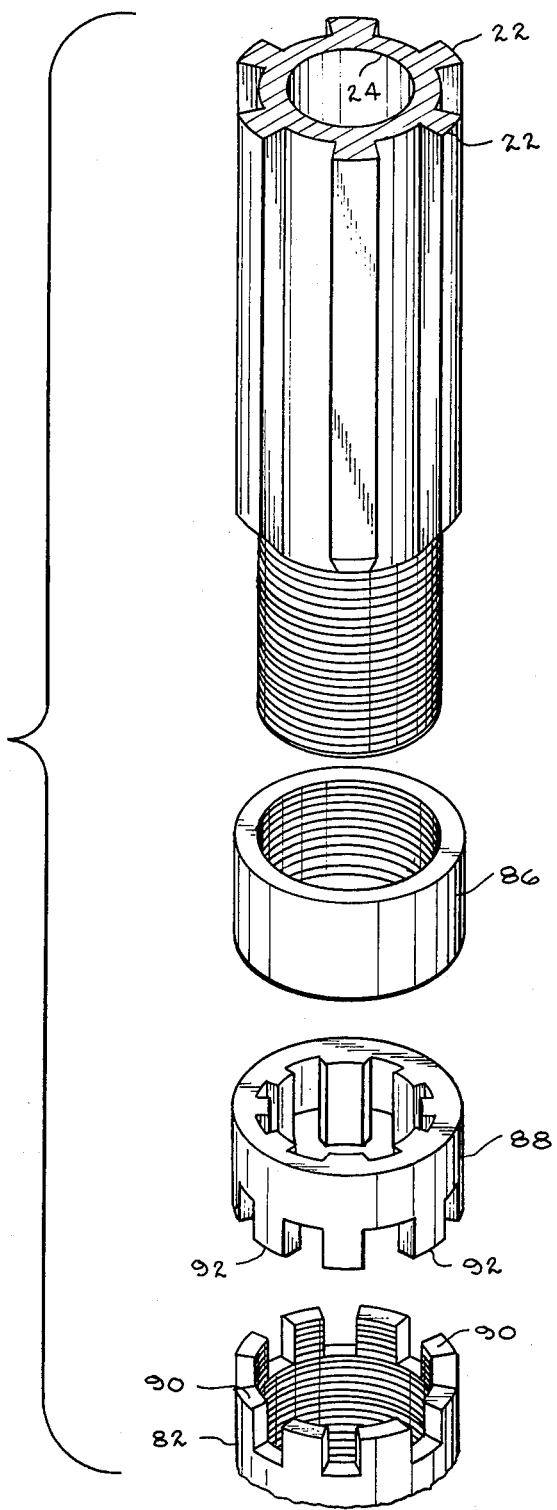
FIG. 5 is an exploded view illustrating the components of the improved mandrel lock.

The balance piston seal means 56 as shown in FIG. 1 is secured on mandrel 12 between the annular rib 58 and the jam nut 60. The seal means 56 is similar to the other seal means except that its sliding seal is an external seal rather than an internal sliding seal. The seal means 56 as shown in FIG. 4 includes the readily replaceable seal cartridge 62 which includes the tubular body 64 having outer seal grooves 66 and inner O ring grooves 68. The O rings 70 are positioned in the grooves 68 and provide the stationary seal against the exterior of mandrel 12. The seals positioned in the grooves 66 each include a back-up ring 72. A seal ring 74 having a recess 76 defined in one end face and an O ring 78 positioned in the recess 76 to spread the end of seal ring 74 inwardly and outwardly into sealing engagement with the bottom of groove 66 and with the interior of sleeve 14. As shown in FIG. 4 two of the seal rings 74 are positioned with their recesses 76 facing upwardly and the other seal ring 74 faces downwardly.

Each of the seal cartridges includes a port extending through its body as shown at a position between the two grooves in which oppositely facing seal rings are positioned. The port equalizes pressure between the sealing side of the seals and the back or non-sealing side. An example of this may be seen with reference to upper seal means 30. As the apparatus moves down a well bore, pressure in the spline drive chamber 34 builds up to equal the hydrostatic pressure in the well bore. Such equalization takes place through the fitting 36. This pressure is exerted on the sealing lips of the seals in cartridge 40. If the balancing port 53 were not included the pressure on the back side of the seals would remain atmosperic. Also as the apparatus strokes downhole, the pressure becomes greater than hydrostatic well bore pressure. Without the pressure balancing provided by port 53 the seals might fail soon after being placed in use.

The seal means describe above minimize the wear on the mandrel 12 and sleeve 14. The cartridge bodies are made of mild steel which does not tend to abrade the sleeve 14 as would a raised diameter portion of the mandrel 12 since the mandrel is made of a high strength alloy steel.

As shown in FIG. 1, the mandrel 12 includes the upper mandrel section 24, the lower mandrel section 82 threaded on upper mandrel section 24 and the locking means 84 which prevent the disengagement of the two mandrel sections 24 and 82. The locking means 84 includes the lock nut 86, the keyed lock ring 88 and the teeth 90 formed in the upper end of the lower mandrel section 82. The keyed lock ring 88 has teeth 92 on its lower end adapted to engage in the teeth 90 and an internal configuration having grooves to receive the splines on the upper mandrel section 24 and thereby prevent its rotation thereon as hereinafter explained.

The mandrel 12 is assembled by threading the lock nut 86 on the lower end of upper mandrel section 24 as far as possible. The keyed lock ring 88 is then slipped on the end of section 24 and then lower mandrel section 82 is threaded onto section 24 power tight. The keyed lock ring 88 is then moved down into engagement with the upper end of mandrel section 82. If the teeth 90 and 92 do not mesh, section 82 is backed off just enough so that they do mesh. Thereafter, the lock nut 86 is threaded down into engagement with lock ring 88 to hold the ring 88 in engagement with the upper end of section 82. With the components in this position the lower mandrel section 82 is prevented from rotating relative to upper mandrel section 24 and is thereby effectively locked thereon.

The middle seal means 32 and the balance piston seal means 56 define the chamber 94 between sleeve 14 and mandrel 12 which chamber is in communication with the interior of mandrel 12 through the port 96 in mandrel 12. The lower seal means 38 and the balance piston seal means 56 define the chamber 98 between the sleeve 14 and the mandrel 12 which chamber is in communication with the exterior of sleeve 14 through the port 100 in sleeve 14. The chambers 94 and 98 are sized to provide a pressure balancing of the torque transmission tube 10 to prevent it from being pumped open or to extended position.

From the foregoing it can be seen that the improved telescoping torque transmission apparatus of the present invention includes a unique sealing means in the form of a readily replaceable cartridge which minimizes the wear on the mandrel and sleeve. Also the improved spline transmission means with the bearing inserts on both sides of each spline assures minimum wear on the splines and grooves. The improved mandrel locking means assures that the two mandrel sections do not disengage from each other. Also the spline drive chamber is provided with a pressure equalizing fitting to reduce friction and minimize wear.

Further in operation the apparatus of the present invention efficiently transmits torque without limiting its telescoping movement because it is pressure balanced and will function as an integral part of a drill string while providing compensation for the heave of the floating drilling structure from which the drill string is being operated. Further, the apparatus described herein can be run into a well bore with a portion of the drill string suspended below it and will not disengage itself in use.

What is claimed is:

1. A torque transmission tube, comprising
a mandrel,
a sleeve surrounding said mandrel and slidable axially thereon,
said sleeve having a plurality of recesses therein along a portion of its length,
said mandrel having a plurality of splines extending therefrom along a portion of its length,
said recesses having a circumferential width greater than the circumferential width of said splines,
a pair of driving keys positioned in each of said recesses and interposed between the sidewalls of said recess and of said splines,
said mandrel includes an upper section, a lower section, and means locking said upper and lower sections together, and
said locking means includes
a lock nut,
a keyed ring,
said lock nut being threaded onto the lower end of said upper section,
said upper section having said splines thereon,
said lower section having an abutment adapted to engage a shoulder on said sleeve to limit the axial movement of said sleeve on said mandrel sections,
said keyed ring engaging with the splines of said upper sections and having depending teeth,
said lower section being threaded on said upper section and having upwardly extending teeth adapted to engage the teeth on said keyed ring,
said lock nut adapted to be threaded down on said upper section to retain said keyed ring teeth in engagement with said lower section teeth to thereby prevent unthreading of said lower section.

2. A torque transmission tube, comprising
a mandrel having means for connecting to a drill string at one end,
a sleeve positioned around a substantial portion of said mandrel and being slidable axially thereon,
said mandrel and said sleeve defining a splined driving connection whereby rotation of said mandrel rotates said sleeve,
said sleeve having means for connecting to a drill string at one end whereby said mandrel and said sleeve may be connected in a drill string, said sleeve and said mandrel having interfering projections limiting the extent of relative axial movement between said sleeve and said mandrel, a port defined through said mandrel into a first balance chamber between said mandrel and said sleeve, a port defined through said sleeve into a second balance chamber between said mandrel and said sleeve, means for sealing between said mandrel and said sleeve above and below each of said balance chambers, and above and below said splined driving connection to form a spline chamber, valve means for equalizing pressure between said spline chamber and the exterior of said sleeve, said splined driving connection including splines, key and bearing inserts, said bearing being positioned on both the leading and trailing sides of each of said splines, said mandrel including a top section and a bottom section, means for locking said top and bottom mandrel sestions together, said sealing means each including a metal seal ring having an inner and an outer groove, seal rings positioned in said inner and outer grooves.

3. A torque transmission tube according to claim 2 wherein said sealing means each includes, a tubular body having a plurality of grooves in its exterior and interior surfaces, the grooves in one of said exterior and interior surfaces being designed to receive rings, the grooves in the other surface being substantially longer and deeper than said O ring grooves to receive packing seal means, said packing seal means including a back-up ring, a seal ring having a rectangular shape in section with a recess in its pressure end, an O ring larger than said recess positioned in said recess to spread the pressure end of said seal ring whereby the inner and outer corners of said ring are urged into sealing engagement with the interior of the groove and the surface to be sealed against.

4. A torque transmission tube according to claim 3 wherein, said O rings are positioned on the interior of said body.

5. A torque transmission tube according to claim 3 wherein, said O rings are positioned in the exterior of said body.

6. A torque transmission tube according to claim 2 wherein said sealing means each includes, a tubular body having internal and external grooves, and annular sealing means positioned in each of said grooves.

* * * * *

UNITED STATES PATENT OFFICE
CERTIFICATE OF CORRECTION

Patent No. 4,054,040      Dated October 18, 1977

Inventor(s) Weldon L. Medders

It is certified that error appears in the above-identified patent and that said Letters Patent are hereby corrected as shown below:

Column 3, line 18, change "atmosperic" to -- atmospheric --.

Column 5, lines 24 and 25, change "sestions" to -- sections --.

Column 6, line 14, before "ring" insert -- seal --.

Signed and Sealed this

Seventh Day of March 1978

[SEAL]

Attest:

RUTH C. MASON
*Attesting Officer*

LUTRELLE F. PARKER
*Acting Commissioner of Patents and Trademarks*